2 Sheets—Sheet 1.
A. J. BLACKFORD.
HYDROCARBON BURNER.
No. 11,592. Reissued Mar. 2, 1897.
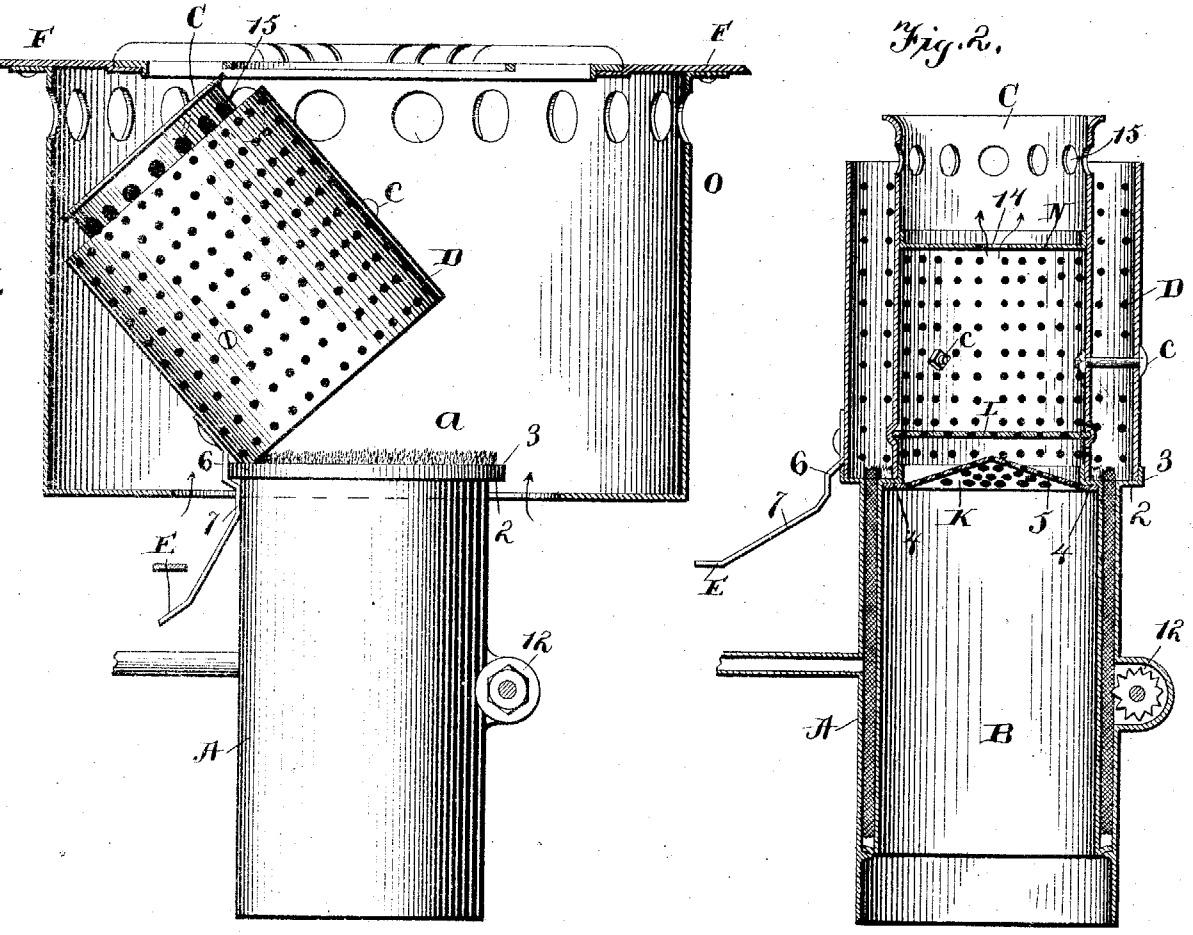
Witnesses
Geo. E. Fuch.
James W. Evans
Inventor
Atwell J. Blackford
By Attorneys Pattison & Mechlin 2 Sheets—Sheet 2.

A. J. BLACKFORD.

HYDROCARBON BURNER.

No. 11,592. Reissued Mar. 2, 1897.

Witnesses
Geo. E. Fuch.
James C. Bevans

Inventor
Atwell J. Blackford
By Attorneys Pattison & Mesbit

UNITED STATES PATENT OFFICE.

ATWELL J. BLACKFORD, OF MEDINA, OHIO, ASSIGNOR OF ONE-HALF TO THE DURAND MANUFACTURING COMPANY, OF SAME PLACE.

HYDROCARBON-BURNER.

SPECIFICATION forming part of Reissued Letters Patent No. 11,592, dated March 2, 1897.

Original No. 518,305, dated April 17, 1894. Application for reissue filed April 18, 1896. Serial No. 587,878.

*To all whom it may concern:*

Be it known that I, ATWELL J. BLACKFORD, a citizen of the United States, residing at Medina, in the county of Medina and State of Ohio, have invented certain new and useful Improvements in Hydrocarbon-Burners; and I do declare that the following is a full, clear, and exact description of the invention, which will enable others skilled in the art to which it appertains to make and use the same.

My invention relates to hydrocarbon-burners of the variety in which a wick is used, substantially after the fashion of the Argand burner, but the wick serving essentially as a means of conveying the fluid to surrounding vaporizing-channels, where it is vaporized by the bottom and side walls of said channels and directly from the wick, producing a vapor or gas which has oxygen mixed therewith simultaneous with its generation, producing at a point above the wick a blue flame of large volume and intense heating capacity, in contradistinction to burning the oil directly at the wick, as in a lamp which produces a white illuminating flame of low heating capacity.

The invention consists in the several features of construction and combinations of parts, substantially as shown and described, and particularly pointed out in the claims.

Figure 4:
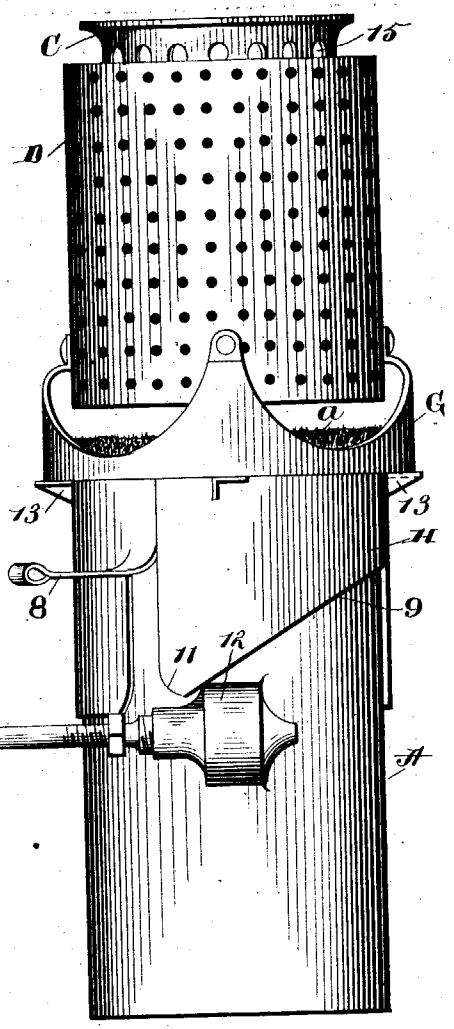
Figure 3:
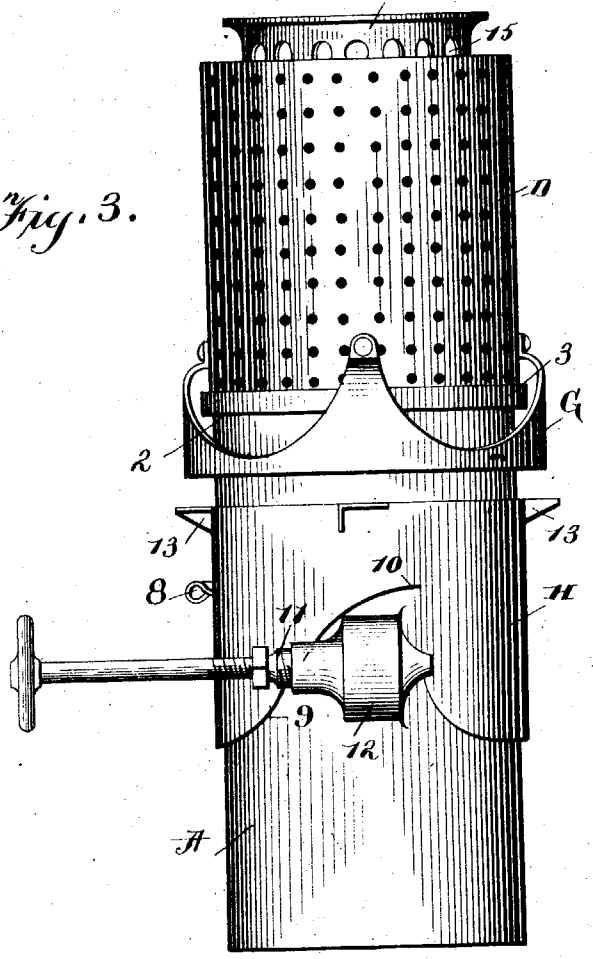

In the accompanying drawings, Figure 1 is a side elevation of the burner, showing the combustion-tubes in a tilted position, and a vertical central sectional elevation of the protecting drum or hood about the upper portion of the burner. Fig. 2 is a vertical sectional elevation of the burner and combustion tubes as they appear in use. Fig. 3 is a side elevation of a burner and burner-tubes constructed as shown in Figs. 1 and 2, but showing modified means for raising said tubes from the burner to enable the burner to be lighted. Fig. 4 is a side elevation of the parts shown in Fig. 3, but with the tubes in a raised position for lighting. In Fig. 3 these tubes are down, as in position for use.

The burner proper, which contains the wick, is made preferably of sheet metal and formed with the inner and outer walls A and B, respectively. Between these walls is a chamber for the wick *a*, and the usual or any approved means may be used for raising and lowering the wick, there being no invention in this part of the burner. There is, however, invention in the upper part thereof.

Vaporizing-chambers are formed inside and outside the wick by forming a shoulder 2 and a vertical flange 3 at the top of the outer wall A and a like shoulder 4 and a vertical flange or wall 5 on the inner wall B, so that channels are formed, as it were, to receive the oil conveyed by the wick to be vaporized by contact with the bottom and side walls thereof. A further function is performed by the walls 3 and 5, respectively, in that they provide a base or support for the perforated combustion-tubes C and D. These perforated tubes form, practically, a continuation of the vertical walls of the channels, and form in practice a mixing-chamber, where air is fed inward through said perforations of the tubes to the generated gas or vapor as it is generated, which produces at the upper end of the tubes an intense blue flame of great volume, owing to the added oxygen and to the increased vaporizing-surface furnished by the channels. The tubes C and D are therefore combined mixing and combustion tubes. These vaporizing-channels have a secondary function, in that whatever oil may escape after extinguishment of the flame is confined in the channels and will be taken up again by the wick, and does not overflow upon the floor or become offensive in any way in or about the burner. These tubes are fixed together in this instance by short connecting-bolts *c*, but of course other equivalent means of connecting said parts may be substituted for the bolts. Thus connected with one another the tubes are seated upon the shoulders 2 and 4, respectively, and within the walls 3 and 5, and the said tubes are free to be raised bodily from said seat. This construction makes it easy and convenient for replacing the tubes when they have been raised or moved, as for trimming the wick or for lighting the burner.

I have shown two ways of raising the tubes for initial lighting. Thus in Figs. 1 and 2 is a peculiarly-formed lever or handle E, fixed rigidly to the outer tube at its bottom and extending outwardly at its free end into convenient position to be reached by the attendant from the front of the stove. It will be noticed also that this handle is bent outward a slight distance at 6 from the tube B, and then downward and inward at 7 to form a shoulder and support for the said tubes when they are in a tilted position, as seen in Fig. 1. This handle is shown in cross-section by its side in Fig. 1, and it will be seen that it has just sufficient width to assist in balancing the tubes in this tilted position. Then when the burner has been lighted with a match or taper or other convenient means the tubes are tilted back into their working position and the said lever thus constructed assists in guiding them to their seat, forming a sort of hinge. It will of course be noticed that there is sufficient distance between the top F of the stove and the burner proper to permit the combustion-tubes to be thus handled.

In Figs. 3 and 4 I show a modification of this construction. In these figures the arrangement is to raise the combustion-tubes within vertical lines instead of tilting them, and here we have a skirting G extending around the outside of the burner and fixed rigidly at intervals to the outer tube D and apart therefrom and from the burner proper about as shown in Figs. 3 and 4. Then I place upon the burner proper a sleeve or tube H, adapted to turn thereon and provided with a handle 8 to turn it. This sleeve or tube has an inclined or cam-shaped edge 9 extending from the point 10, Fig. 3, around to the point 11, Fig. 4, and so inclined or formed and arranged that when the burner-tubes are down upon their seat the said cam or inclined edge will sustain the relation shown in Fig. 3 to the projection 12 upon the outer tube A. This swell or projection is used in this instance for convenience, because it is necessary here to provide a chamber for the wick-controlling mechanism. I might, however, as well provide a suitable projection elsewhere upon the said outer wall of the burner, upon which the incline might ride and serve the same purpose.

At the upper edge of the sleeve or thimble H are lateral projections 13 at intervals to engage the skirting G, and upon which it rests when lifted. These projections 13 might of course be substituted by a flange or its equivalent, or an equivalent construction of the skirting and the said sleeve might be adopted and still be within the spirit of the invention. The exact means here shown need not of course be strictly followed to get the result desired, which is the raising and lowering of the combustion-tubes.

Now, having the parts thus constructed and arranged, the operator seizes the handle 8 and turns it to the right. This causes the inclined edge 9 to ride up on the projection 12, and in thus riding to carry the sleeve H and the skirting and the combustion-tubes upward to a position as shown in Fig. 4, where the combustion-tubes are raised sufficiently above the wick to enable lighting to be effected. The inclination 9 is at sufficient angle to hold the parts in any position to which they may be turned, and the said parts may be supported as shown at Fig. 4, or at a less elevation, if desired. Then when lighting has been effected the said parts are simply turned back to their proper place and the flame is burning. It remains then for the attendant to control the flame just as in an ordinary lamp.

A further feature of the invention is found in the perforated diaphragm K within the burner proper at its upper portion and about opposite the point of combustion; and in conjunction with this diaphragm is another perforated diaphragm L some short distance above the diaphragm K and supported within the inner tube C, as shown, or in some equivalent way. The invention of the lower diaphragm is more particularly to prevent a rush of air up through the burner. It is found that with a diaphragm of this kind perforated for the passage of air, but yet serving as a damper or check to the flow of air, the burner itself is kept cool. There seems to be a quantity of cool air constantly present within the burner beneath said diaphragm and, the effect upon the burner is wholly different from what it would be if this diaphragm were omitted and there were a free flow of air through this space. The diaphragm L, on the other hand, is contributory in a measure to this result and is designed to prevent reflection downward of the heat of the burner. It will be noticed that an air space or chamber is thus formed between the two diaphragms K and L, and this likewise contributes to prevent the downward radiation of the heat, so that with the said diaphragms and the said chamber I am enabled to keep the body of the burner about the wick absolutely cool however long the burner may be used, and this is esteemed a great advantage on many accounts. Another essential and important function of the perforated diaphragm L situated just above but adjacent the horizontal plane of the vaporizing-channels is to retard the upflowing air, and consequently results in forcing the fresh air outward into the mixing-chamber to the generated vapors directly at the point of vaporization, where considerable air is needed, while at the same time sufficient air is allowed to pass through the diaphragm into the tubes above, and hence into the mixing-chamber above the diaphragm, and to feed the interior of the flame at the top of the tubes through the central perforations of the diaphragm. It will also be noticed that the inner tube C has also within it a diaphragm N toward its upper portion and that there is a central air-passage 14 (preferably small) in this diaphragm or disk; also, that the said tube C is perforated beneath the said diaphragm N, but is whole above the same except about the top, where there are large openings or holes 15. Now the essential result of this construction is to retard nearly all the fresh or unvitiated air passing up the inner tube and deflect it through the perforated wall thereof to the ascending vapors to effect an adequate supply of oxygen thereto to produce a blue flame of intense heating capacity and a perfect combustion and yet permit the escape of sufficient unvitiated or fresh air through the central opening of the diaphragm to feed the flame at the top of the combustion-tubes. If some provision of this kind were not made, combustion would occur only in a ring, as it were, about the top of the combustion-chamber, and there would be a dead cold spot in the middle of the ring. This I overcome by the construction shown, and thus diffuse the flame and heat over the entire surface about the burner-chamber. This occurs by reason of air flowing through the central hole 14, which this meets with products of combustion which flow inward from the combustion-chamber through holes 15 into what may be termed a "partial" vacuum within the top of the inner combustion-tube. The fresh heated air fed through the said hole 14 promotes and completes combustion in this central space.

In Fig. 1 a drum O is shown as connected with the top plate of the stove and extending down so as to practically inclose the combustion portion of the burner. This drum is designed to protect the burner from adverse drafts or gusts of wind, which are liable to materially disturb combustion. It is made sufficiently large not to interfere with the movements of the burner-tubes and has an opening about the burner at its bottom and suitable and sufficient opening about its top to permit all the air necessary to supply combustion; but it is also sufficiently closed to prevent the burner from being disturbed from winds or breezes, as noted. In a full-sized burner the space between the perforated tubes is about three-eighths of an inch and equal all around. The perforations in the tubes should start directly at the bottom, so as to promote a blue and odorless flame.

It will be noticed that the tubes may be turned or rotated on their seats, and this is done to adjust them to secure an equal flame all around the burner, providing the wick is not truly trimmed.

Having thus fully described my invention, what I claim, and desire to secure by Letters Patent, is—

1. An Argand burner having at the upper end of its wick-tube a vaporizing-channel in communication with the wick, an outer combustion-tube, an inner perforated combustion-tube, a perforated air-retarding diaphragm spanning the upper end of the wick-tube adjacent the vaporizing-channel, and just below it, and a perforated diaphragm spanning the lower end of the perforated combustion-tube just above the vaporizing-channel, the parts coöperating to retard upward draft and force air through the inner combustion-tube at the point of vaporization, while allowing an upward escape of unvitiated air to within the inner combustion-tube above the said upper diaphragm, for the purpose described.

2. A burner of the type described, having an annular vaporizing-chamber, perforated combustion-tubes surrounding said chamber, a perforated diaphragm situated within the inner perforated tube just above but adjacent the vaporizing-point to arrest and deflect the air through the perforated tube into the mixing-chamber, and permit part of the air to pass into the tube above, and a diaphragm within and spanning the upper portion of the inner tube below its top and provided with a central opening, and imperforate adjacent the wall of the tube whereby most of the air is confined between the diaphragms and forced through the inner perforated tube into the mixing-chamber, and permit an escape of unvitiated air through said central opening to feed the interior of the flame thereabove.

3. In a burner of the type described comprising a burner having inner and outer combustion-tubes constituting a mixing-chamber between them, the inner tube perforated and a diaphragm situated within and at the upper portion of the inner tube and having a central opening, whereby nearly all the upflowing air is retarded within the tube and forced through it into the mixing-chamber and part permitted to pass through said central opening to supply the interior of the flame above with oxygen.

4. A burner of the type described comprising a burner having a mixing-chamber and an inner perforated combustion-tube, the combination therewith of a diaphragm situated within the tube having a central opening, whereby the upflowing air adjacent the perforated tube is retarded and forced therethrough into the mixing-chamber.

5. A burner of the type described, comprising a burner having combustion-tubes forming between them a mixing and combustion chamber, a diaphragm having a central opening situated within the upper portion of the inner tube and below its upper end, the inner tube having passages or openings above and below the diaphragm which establish communication between the inner tube and the mixing and combustion chamber.

6. A burner of the type described, comprising a burner having inner and outer combustion-tubes constituting a mixing-chamber between them, a diaphragm with a central opening situated within the inner tube below its upper end, the inner tube perforated below said diaphragm, and provided with large openings at a point above said diaphragm.

7. A burner of the type described comprising inner and outer perforated tubes constituting a mixing and combustion chamber between them, the inner tube perforated and open at its lower end to the atmosphere, a perforated diaphragm situated within the inner tube near its lower end, a diaphragm with a central opening within the inner tube and situated near its upper end, and openings in said inner tube situated at a point above the said centrally-perforated diaphragm.

8. In an oil-burner, the body of the burner constructed for a wick, the combustion-tubes connected together and free to rotate on the burner, and a single projection on the outer tube forming a pivot on which to tilt said tubes to light the burner, and continued outwardly from the tubes to constitute a handle for rotating said tubes, substantially as described.

9. The burner, and connected inner and outer perforated combustion-tubes having a chamber between them, the inner tube being provided with a diaphragm in its upper end having a central air opening or passage and the said inner tube extended above the outer tube and having a series of large openings about its top above said diaphragm, said inner tube being imperforate between said diaphragm and said openings, substantially as described.

10. The burner described having a pair of perforated combustion-walls and two perforated diaphragms spanning the interior of the burner and arranged respectively in about the plane of the base of the flame and some distance above such base and forming a cooling and air-collecting chamber between them, substantially as described.

11. A burner of the type described, having an annular vaporizing-chamber, perforated combustion-tubes above the vaporizing-chamber, a perforated diaphragm situated within the inner perforated tube just above but adjacent the vaporizing-point to arrest air and deflect the same through the perforated tube into the mixing-chamber and permit part of the air to pass into the tube above, and a perforated diaphragm within and spanning the upper portion of the inner tube below its upper extremity, whereby most of the upflowing air is confined between the diaphragms and forced through the inner perforated tube into the mixing-chamber and a portion of unvitiated air permitted to escape through the upper diaphragm to feed the interior of the flame thereabove.

Witness my hand to the foregoing specification this 31st day of March, 1896.

ATWELL J. BLACKFORD.

Witnesses:

Z. DAVIS,

A. C. MCCORMACK